United States Patent [19]

Kuyper et al.

[11] Patent Number: 4,826,887

[45] Date of Patent: May 2, 1989

[54] PROCESS FOR THE PREPARATION OF POLYCARBONATES

[75] Inventors: Jan Kuyper; Peter W. Lednor; George A. Pogany, all of Amsterdam, Netherlands

[73] Assignee: Shell Oil Company, Houston, Tex.

[21] Appl. No.: 235,756

[22] Filed: Aug. 22, 1988

Related U.S. Application Data

[60] Division of Ser. No. 926,700, Nov. 4, 1986, abandoned, which is a continuation of Ser. No. 197,487, May 23, 1988, abandoned.

[30] Foreign Application Priority Data

Nov. 14, 1985 [GB] United Kingdom ................ 8528071

[51] Int. Cl.$^4$ .............................................. C08G 59/00
[52] U.S. Cl. ................................... 521/189; 521/178; 528/371; 528/405
[58] Field of Search ................ 528/405, 371; 521/178, 521/189

[56] References Cited

U.S. PATENT DOCUMENTS 3,248,415 4/1966 Stevens ............................... 260/463
4,500,704 2/1985 Kruper, Jr. et al. ................ 528/405

FOREIGN PATENT DOCUMENTS 0090445 10/1983 European Pat. Off. .

*Primary Examiner*—Morton Foelak

[57] ABSTRACT

Process for the preparation of polycarbonates by reacting at least one epoxy compound with carbon dioxide at 40° to 200° C. and 2 to 40 bar in the presence of a catalytic amount of a double metal cyanide complex and (a) one or more salts composed of at least bivalent metal ions and metal-free anions having a solubility in water of at least 1 g/100 ml at 25° C., and/or (b) one or more no-metal containing acids of which a 0.1 N solution in water at 25° C. has a pH not exceeding 3.

28 Claims, No Drawings

PROCESS FOR THE PREPARATION OF POLYCARBONATES

This is a division of application Ser. No. 926,700, filed Nov. 4, 1986 which is a continuation of Ser. No. 197,487 filed May 23, 1988, both now abandoned.

BACKGROUND OF THE INVENTION

The present invention relates to a process for the preparation of polycarbonates and to compositions based on such polycarbonates.

The preparation of polycarbonates, which compounds are herein defined as polymeric reaction products of carbon dioxide and an epoxy compound is known.

U.S. Pat. No. 4,500,704 discloses a process for the preparation of linear polycarbonates which process employs a double metal cyanide complex as the catalyst. Said process is preferably carried out at a pressure in the range of from 27.6 to 75.8 bar absolute. Below a pressure of 27.6 bar absolute, the product yields are low. Moreover, the process requires relatively long reaction times, as may be concluded from the examples where the shortest reaction time is approximately 48 hours.

U.S. Pat. No. 3,248,415 describes the preparation of polycarbonates in the presence of a potassium carbonate catalyst and an organic compound having at least 2 usually 2 to 4 active hydrogens. All examples, however, are restricted to the use of dihydric organic compounds. The process requires relatively high pressures, temperatures and long reaction times, while the resulting polycarbonates have a relatively low molecular weight.

SUMMARY OF THE INVENTION

Surprisingly it has now been found that it is possible to prepare polycarbonates by a process which does not require such high pressures and long reaction times, and wherein the catalyst comprises a double metal cyanide complex compound in combination with a cocatalyst.

DETAILED DESCRIPTION OF THE INVENTION

The invention provides a process for the preparation of a polycarbonate, comprising the reaction of at least one epoxy compound and carbon dioxide, at a temperature in the range of from 40° to 200° C., and at a pressure in the range of from 2 to 40 bar absolute, characterized in that the reaction is carried out in the presence of a catalytic amount of a double metal cyanide complex, and a. one or more salts composed of at least bivalent metal ions and metal-free anions, having a solubility in water of at least 1 g/100 ml at 25° C. has a pH exceeding 3.

b. one or more no-metal containing acids of which a 0.1N solution in water at 25° C. has a pH not exceeding 3.

The term cocatalyst(s) refers to the compounds hereinbefore defined under a and/or b.

The epoxy compounds which may be employed in the practice of the present invention include 1,2-epoxides and 1,3-epoxides (oxetanes) such as ethylene oxide, 1,3-propylene oxide, epichlorohydrin, 1,2-butene oxide, 4-chloro-1,2-butene oxide, 1,2-hexene oxide, 1,2-dodecene oxide, isobutylene oxide, styrene oxide, 1,2-pentene oxide, isopentene oxide, 1,2-heptene oxide, methyl glycidyl ether, ethyl glycidyl ether, allyl glycidyl ether, phenyl glycidyl ether, butadiene monoxide, isoprene monoxide, 1,3-propylene oxide, tolyl glycidyl ether, 3,3-dimethyl oxetane and 3-vinyl-3-methyl oxetane. Preference is given to the use of lower alkylene oxides such as ethylene oxide, 1,2-propylene oxide, butylene oxide, butadiene monoxide, methyl glycidyl ether and phenyl glycidyl ether, in particular 1,2-propylene oxide. Mixtures of epoxides, in particular mixtures of propylene oxide and other epoxides, such as ethylene oxide can also be applied.

Although any double metal cyanide type compound may be used in the preparation of a polycarbonate according to the process of the present invention, there is a preference for the use of double metal cyanide complex of general formula:

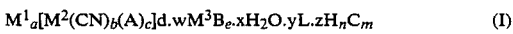
$$M^1_a[M^2(CN)_b(A)_c]d \cdot wM^3B_e \cdot xH_2O \cdot yL \cdot zH_nC_m \qquad (I)$$

wherein $M^1$ represents at least one of Zn(II), Fe(II), Co(II), Ni(II), Mn(II), Cu(II), Sn(II) or Pb(II); $M^2$ represents at least one of Fe(II), Fe(III), Co(III), Cr(III), Mn(II), Mn(III), Ir(III), Rh(III), Ru(II), V(IV) or V(V); $M^3$ represents $M^1$ and/or $M^2$; A, B and C each represent an anion which may be the same or different; L represents an alcohol, aldehyde, ketone, ether, ester, amide, nitrile or sulphide or mixtures thereof; a and d are numbers to satisfy the valency state of $M^1$ and $M^2$ in the double metal cyanide part of the general formula I; b and c are integers (b>c) which together with a and d provide the electroneutrality of the double metal cyanide part of the general formula I; e is an integer satisfying the valency state of $M^3$; n and m are integers satisfying the electroneutrality of HC, and w is a number between 0.1 and 4;
x is a number up to 20;
y is a number between 0.1 and 6, and
z is a number between 0.1 and 5.

Such double metal cyanide complex type catalysts have been described in European patent application EP No. 0090444, which document also discloses their preparation. Especially preferred double metal cyanide complex catalysts are zinc hexacyano cobaltates of general formula:

$$Zn_3[Co(CN)_6]_2 \cdot wM^3X_2O \cdot yL \cdot zHX \qquad (II)$$

wherein X represents a halide, preferably Cl or Br, $M^3$ represents Zn(II), Co(II), or Fe(II), L represents an alcohol, ether or ester, with a preference given to acyclic diethers, w is a number between 0.7 and 1.5;
x is a number between 2 and 10;
y is a number between 1.5 and 3, and
z is a number between 0.15 and 1.5.

The cocatalysts which are employed in the present process in combination with the hereinbefore described double metal cyanide complexes have been disclosed in European patent application No. 00090445.

The amount of cocatalyst(s) to be applied is not critical and may vary between wide limits. Good results can be obtained using a double metal cyanide-type catalyst and one or more compounds a and/or b in a molar ratio in the range of from 10 to 0.1, preferably in the range of from 4. to 0.2.

A preferred cocatalyst is zinc sulphate, as such or in the hydrate form.

Although polycarbonates may conveniently be prepared by the process of the present invention, it is preferred to conduct the process in the presence of one or more organic compounds having at least one active hydrogen as this will result in polycarbonates having at least one hydroxyl group per molecule.

The preparation of polycarbonates by reaction of carbon dioxide and an epoxy compound in the presence of a potassium carbonate catalyst and an organic compound having 2 to 4 active hydrogens has been disclosed in U.S. Pat. No. 3,248,415. According to U.S. Pat. No. 3,248,415, the preparation of polycarbonates in the presence of an organic compound having 2 active hydrogens, i.e. to the preparation of linear polycarbonates, is generally carried out at a temperature in the range of from 150° to 200° C. and at a pressure in the range of from 13.8 to 345 bar absolute. Under these rather stringent reaction conditions the reaction generally requires more than 24 hours, while the highest disclosed molecular weight of the thus produced linear polycarbonates was in the range of 1500.

The number of active hydrogen sites per molecule of the or each organic compound having at least one active hydrogen plays an important part in determining the hydroxyl functionality of the ultimate product, as in theory each active hydrogen may be converted into a hydroxyl terminated polycarbonate copolymer chain. Hence, when aiming e.g. for polycarbonate polyols having an average hydroxyl functionality of more than two, the organic compound or compounds should on average have more than two active hydrogens per molecule.

Suitably such compounds include alkanols such as methanol, ethanol, propanol, butanol and hexanol, thiols such as butane thiol, glycols such as propylene glycol and polypropylene glycol, glycol monoalkyl ethers such as mono (m)ethoxy ethylene glycol, aromatic hydroxy compounds such as phenol, the cresols and diphenylol propane, trimethylol propane, pentaerythritol, carboxylic acids or anhydrides such as fumaric acid, maleic acid and phthalic acid as well as the corresponding low-molecular weight alkoxylated products, e.g. compounds having a molecular weight between 200 and 2000, preferably based on ethylene oxide and/or propylene oxide and a lower polyalkanol such as glycol or glycerol, i.e. a propoxylated or ethoxylated glycol or a propoxylated or ethoxylated glycerol.

The double metal cyanide complex type catalysts such as those of general formula I and/or II may be employed as a solid or in suspension form. With the latter it is preferred to employ the catalyst as a suspension in the low molecular weight alkoxylated polyhydric alcohol, e.g., propoxylated glycol or propoxylated glycerol and the like, when appropriate.

The double metal cyanide complex catalyst and the cocatalyst(s) may be added separately to the reactor or the cocatalyst(s) may first be added to the double metal cyanide complex suspension. Preferably, however, the cocatalyst is already added during the preparation of the catalyst suspension.

The process of the present invention is generally carried out at a temperature in the range of from 40° to 200° C. Temperatures above 200° C. may result in catalyst decay and hence reduced activity and/or yield. Below 40° C. the catalytic activity will be too low. Preferably, the process is carried out at a temperature in the range of from 70° to 120° C.

The pressure at which the reaction between carbon dioxide and an epoxide compound is carried out may vary widely and can go to values well over 40 bar absolute. It is an advantage that the present process may be conducted at a pressure in the range of from 2 to 40, preferably 2 to 15 bar absolute. It will be understood by those skilled in the art that the incorporation of carbon dioxide in the polycarbonate will to a certain degree be determined by the pressure in the reactor.

According to a preferred embodiment of the present invention the reaction is initiated by contacting a small portion of the epoxy compound(s) with the catalyst and cocatalyst in the presence of an active hydrogen containing compound before introducing carbon dioxide. Both for the initiating step and for the consecutive, copolymerization step it is important that the reactor and its contents are oxygen-free, which can be accomplished by applying one or more sequential evacuation and nitrogen flushing steps.

When a polycarbonate is prepared which is based on more than one epoxy compound it is possible to feed the epoxy compounds into the reactor simultaneously or in one or more consecutive steps. The amount of epoxy compound(s) to be used in the process according to the present invention is usually selected so as to be sufficient for the formation of a polycarbonate having the desired molecular weight.

The combined amount of catalyst and a cocatalyst used in the process for the preparation of a polycarbonate according to the present invention is not very critical and may vary between wide limits. Suitably, the combined amount of catalyst and cocatalyst is within the range of from 0.01 to 15%w of the amount of initiator when this compound is used, and preferably in the range of from to 5% thereof.

The process may be carried out batchwise, as a semicontinuous process, or as a fully continuous process. After the reaction has reached the desired stage, or when the reaction has stopped, the polycarbonate is removed from the reactor. The collected polycarbonate will always contain a certain amount of cyclic carbonate since it is the reaction product of carbon dioxide and a mole of epoxy compound. The polycarbonate may be separated from the cyclic carbonate by distillation or by other separation techniques.

The polycarbonates and especially those having at least one hydroxyl group per molecule are versatile products which may be used in different applications, as such or via further chemical modification. Potential outlets include: the preparation of surfactants, or as in plasticizers, in elastomeric or resinous compositions, as a polyol component in polyurethanes or polyurethane foams. The actual application will, to a large extent, be determined by the hydroxyl functionality of these polycarbonates. An especially valuable polycarbonate is a polycarbonate having at least three hydroxyl groups per molecule, i.e. prepared via a process employing a compound having three active hydrogens, as these polycarbonates are very suitable for the preparation of polyurethane foams.

The present invention also relates to the preparation of foam-forming compositions based on the hereinbefore described polycarbonates having a hydroxyl functionality of at least three and to polyurethane foams obtained from said foam-forming compositions.

To this end, the polycarbonate polyols may be formulated with, and reacted in the presence of, compounds which are also used in conventional foam-forming compositions for the preparation of polyurethane foams, such as polyisocyanates, blowing agents, catalysts, foam stabilizers, etc.

The isocyanate-containing compounds which may be used in these compositions include various isomers and derivatives of toluene diisocyanate (TDI) such as 2,4- and 2,6-isomers of TDI or mixtures thereof and 4,4'-diphenylmethane diisocyanate (MDI). Crude grades of isocyanates, both of TDI and MDI, may also be used. In the practice of the present invention, thee is a preference for the use of an approximately 80:20 blend of the 2,4- and 2,6-isomers of TDI.

Generally, an excess of isocyanate over hydroxyl will be used, which excess—also referred to as isocyanate index—is defined as the number of isocyanate equivalents divided by the number of hydroxyl equivalents multiplied by 100%.

The reaction between the hydroxyl and the isocyanate groups may be conveniently catalyzed by compounds which include tertiary amines such as triethylamine, triethylaminoethanol, pentamethyldiethylenetriamine, bis(2-dimethylaminoethyl)-ether, and/or organic tin compounds such as stannous octoate, stannous stearate and dibutyltindilaurate.

In order to obtain a foam, a conventional blowing agent such as trichlorofluoromethane may be employed or alternatively some water may be included in the formulation to promote foam formation by reaction with isocyanate. The foam-forming composition may further include auxiliary additives such as silicon oils, which may be employed, e.g. as foam stabilizers, and halide- or phosphorous-containing compounds which may act as flame retardants.

The invention will be further understood from the following Examples.

The double metal cyanide complex catalyst/cocatalyst system used in the examples below was prepared as follows:

Preparation of
$Zn_3[Co/CN_6]_2.2DME.6H_2O/ZnSO_4$-catalyst system 12.3 kg zinc chloride was dissolved in 150 kg water. An aqueous $K_3Co(CN)_6$ solution (100 kg containing 18.5 mol $K_3Co(CN)_6$) was added to the $ZnCl_2$ solution in 1 hour. The $Zn_3[Co(CN)_6]_2$ complex precipitated immediately and a milky suspension resulted. After 13 hours (overnight) 185 kg of an aqueous $K_3Co(CN)_6$ solution containing 18.5 mol of $K_3Co(CN)_6$ was added in 1 hour to the above reaction mixture. Subsequently, 92.5 kg of an aqueous KOH solution containing 43.9 moles of KOH was added to the reaction mixture in 55 minutes.

The reaction mixture was gradually heated to 90° C. over a period of 2 hours and 25 minutes, followed by a 5-minute post reaction at 90° C. The solids were separated from the reaction mixture by filtration over a Buchner type vacuum filter. The filter cake was washed repeatedly with water of 60° C. (150 kg) and with cold water (50 kg), to remove KCl.

The wet filter cake (26.1 kg) was reslurried in 17.9 kg $H_2O$ and 100 kg DME (dimethoxyethane). 24.5 kg of an aqueous HCl solution containing 83.8 moles of HCl was added to the slurry in 3 minutes and the mixture was stored at ambient temperature for 161 hours. Subsequently, the reaction mixture was heated at 71° C. for 3 hours. After cooling to 20° C., 15 kg of an aqueous $ZnSO_4$ solution containing 22.1 moles of $ZnSO_4$ was added to the above mixture in 2 minutes and kept for 16 hours at that temperature. Finally, the reaction mixture was suspended in 440 kg of CARADOL 555-1 (trade name), being a propoxylated glycerol of molecular weight 300, before removing the volatile components (DME and $H_2O$) via a vacuum flash.

The final suspension was found to contain 4.0%w of catalyst and had a Zn content of 1.24%w and Co content of 0.44%w.

EXAMPLES 1 TO 7

Preparation of polycarbonate polyols having hydroxyl values in the range of 55 to 65 mg KOH/g 25 g of the catalyst suspension as described hereinbefore together with 121.7 g of CARADOL 555-1 was introduced into a 2.5.1 stainless steel autoclave equipped with an isolated external electrical heating spiral, an internal cooling spiral, through which cold water could be circulated, a manometer and a thermometer.

The autoclave was closed and evacuated under slow stirring, to arrive at an absolute pressure of 0.2 bar. Subsequently, the pressure was allowed to increase again to 1 bar absolute by means of an $N_2$ sparge. In total, the autoclave was evacuated three times and after the final evacuation the pressure was left at 0.2 bar absolute.

Subsequently, propylene oxide was introduced into the autoclave in an amount which approximately corresponded to 60%w of the amount of propoxylated glycerol present in the autoclave. The temperature was raised to 98° C. and maintained at that level, as a result of which the pressure increased to a level of 3-4 bar absolute. Excess heating resulting from a possible exotherm was avoided by controlled water cooling. After a period of approximately half an hour to an hour the pressure had dropped approximately 0.5 bar absolute. Subsequently, the temperature was set at the required level for copolymerization and propylene oxide was pumped in continuously over a period of time as indicated in Table 1. The total amount of propylene oxide used in each experiment was 1354 g. Simultaneously, $CO_2$ is added in a controlled manner so as to arrive at a total pressure in the autoclave as indicated in the Table.

Upon completion of the propylene oxide addition, the pressure in the autoclave is maintained at the same level by means of $CO_2$ pressure for a post reaction until no further significant quantities of $CO_2$ were incorporated. Next, the contents of the autoclave were cooled and allowed to run out, taking care that unreacted $CO_2$ could escape without giving frothing problems. Propylene carbonate present in the reaction product was distilled out at 150° C. and sub-atmospheric pressure, e.g. 0.3 mm Hg.

The reaction conditions for each Example are given in Table I together with the corresponding product data.

TABLE I

| Example No. | Copolym. Temp. °C. | Pressure bar abs. | Propylene oxide addition time, hours | Total* reaction time, hours | Product yield g | Polyol yield g | $CO_2$ content % mol | Calculated hydroxyl value mg KOH/g |
|---|---|---|---|---|---|---|---|---|
| 1 | 98 | 2.5 | 9 | 13 | 1627.8 | 1419.4 | 4.8 | 55 |
| 2 | 98 | 5.0 | 9 | 15 | 1694.2 | 1352.0 | 7.4 | 58 |
| 3 | 98 | 8.5 | 11 | 17 | 1781.5 | 1234.6 | 10.5 | 63 |
| 4 | 110 | 8.5 | 4 | 10 | 1732.8 | 1297.9 | 9.9 | 60 |
| 5 | 90 | 8.5 | 4 | 15 | 1782.9 | 1260.5 | 13.4 | 62 |
| 6 | 98 | 8.5 | 1 | 11 | 1772.3 | 1345.2 | 12.9 | 58 |
| 7 | 98 | 8.5 | 2 | 9 | 1777.3 | 1317.1 | 12.5 | 59 |

*Starting from gradual addition of propylene oxide

EXAMPLE 8

Preparation of a polycarbonate polyol having hydroxyl value of approximately 30 mg KOH/g Employing a 12.51 stainless steel autoclave, fitted with the same equipment as the autoclave used in the Examples 1 to 7, a larger scale preparation of a polycarbonate polyol having a higher molecular weight than those of the Examples 1 to 7, was carried out. To this end 118.75 g of a catalyst suspension, as hereinbefore described was introduced into the autoclave together with 217.5 g of CARADOL 555-1. The autoclave was closed and the same evacuation procedure as in Examples 1 to 7 was applied to remove any oxygen present, at the end of which procedure 285 g of propylene oxide was introduced for the initiation of the reaction. The temperature was raised to 98° C. and maintained at this level as a result of which the pressure increased to a level of 3-4 bar absolute. Excess heating was avoided by controlled water cooling. After a period of approximately half an hour the pressure had dropped to 0.5 bar absolute. Subsequently, the temperature was set at 98° C. and 7097 g of propylene oxide was fed into the reactor over a period of 3.5 hours. Simultaneously, $CO_2$ as introduced into the reactor so as to arrive at a total pressure of 8.5 bar absolute and the pressure was maintained at that level by an automatic $CO_2$ feed. Upon completion of the propylene oxide introduction, the reaction was continued for 8 hours after which no further significant quantities of $CO_2$ were incorporated.

After cooling and stripping unreacted monomer, 8769 g of a mixture of polycarbonate polyol and cyclic propylene carbonate was collected. Previous results had indicated that reaction product of the present invention had a maximum propylene carbonate content of approximately 31%w. Applying this data to the present reaction-product and knowing that 331.5 g of a three functional initiator having a molecular weight of 300 had been used the resulting polycarbonate polyol was calculated to have a molecular weight of 5475 and a hydroxyl value of 30.7 mg KOH/g.

EXAMPLE 9

Preparation of a polycarbonate polyol having a hydroxyl value of approximately 48 mg KOH/g Using the same equipment and following the same procedure as in Example 8, a polycarbonate polyol was prepared having a target hydroxyl value of 48 mg KOH/g, but differing in that 118.75 g of catalyst suspension together with 468 g of CARADOL 555-1 were introduced into the reactor. For the initiating step 457 g of propylene oxided was introduced. After the initiating step 7128 g of propylene oxide was added to the reactor over a period of 4 hours, while the total reaction time was 11 hours. After cooling and stripping unreacting monomer, 9195.2 g of product containing 24.2%w. of propylene carbonate was collected, which low molecular weight component was removed via distillation at 150° C. and at a pressure of 0.3 mm Hg.

The resulting polycarbonate polyol had a $CO_2$ content of 13.5%m and a hydroxyl value of 49 mg KOH/g.

EXAMPLE 10

Preparation of a polycarbonate diol

Using the same equipment and following the same procedure as in Example 8, a polycarbonate diol was prepared. In view of the fact that the ultimate polycarbonate to be made should have two hydroxyl groups per molecule, the CARADOL 555-1 was replaced with a polypropylene glycol having a molecular weight of 400.

662.75 g of said polypropylene glycol containing 4.75 g of catalyst (as used in the previous Examples) was introduced into the reactor. For the initiating step 290 g of propylene oxide was employed. Subsequently 6761 g of propylene oxide was fed into the reactor over a period of 4 hours. After a total reaction time of 8.5 hours and after a light strip 8411.2 g of product was collected, which was found to contain 22.5%w of propylene carbonate. Distillation to remove said propylene carbonate resulted in a polycarbonate diol having a $CO_2$ content of 13.2%m.

EXAMPLE 11

Preparation of polycarbonate polyol-based polyurethane foam

The following foam-forming formulation was used in the preparation of the polycarbonate polyol-based foam.

| Polyol | Hydroxyl value 49 mg KOH/g (ex Example 9) | 100 pbw* |
|---|---|---|
| TDI | (80/20 w/w blend of 2,4- and 2,6-isomer) index | 107** |
| water | | 3.8 pbw |
| Niax A | bis(2-dimethylaminoethyl)-ether (70% in dipropyleneglycol) | 0.1 pbw |
| BF 2370 | Silicone oil ex Goldschmidt | 1.1 pbw |
| stannous octoate | | 0.2 pbw |

*pbw = part by weight
**107% isocyanate equivalents on polyol and $H_2O$ hydroxyl equivalents The foam was made by mixing polycarbonate polyol and polyisocyanate, this was followed by the addition of water, amine, silicone oil and stannous octoate whereupon the mixture was allowed to foam. The resulting foam was found to have the following properties:

| | |
|---|---|
| Density 26 kg/m$^3$ | 26 kg/m$^3$ |
| Compression load deflection (40%) DIN53577 | 4.24 KPa |
| Tensile ASTM D.3574 | 103 KPa |
| Elongation ASTM D.3574 | 140% |
| Resilience ASTM D.3574 | 24% |
| Tear strength ASTM D.3574 | 0.3 KN/m |

What is claimed is:

1. A foam based on a polycarbonate polyol made by reacting at least one epoxy compound and carbon dioxide at a temperature in the range of from 40° to 200° C. and at a pressure in the range of from 2 to 40 bar absolute, characterized in that the reaction is carried out in the presence of a catalytic amount of a double metal cyanide complex and a cocatalyst selected from the group consisting of
   (a) one or more salts composed of at least bivalent metal ions and metal-free anions, having a solubility in water of at least 1 g/100 ml at 25° C.
   (b) one or more metal-free acids of which a 0.1N solution in water at 25° C. has a pH not exceeding 3, and
   (c) mixtures of (a) and (b).

2. A foam according to claim 1, wherein the double metal cyanide complex and the cocatalyst are used in a molar ratio in the range of from 10 to 0.1.

3. A foam according to claim 1 wherein the double metal cyanide complex has the general formula $$M^1{}_a[M^2(CN)_b(A)_c]_d \cdot wM^3B_e \cdot xH_2O \cdot yL \cdot zH_nC_m \quad (I)$$

wherein $M^1$ represents at least one of Zn(II), Fe(II), Co(II), Ni(II), Mn(II), Cu(II), Sn(II) or Pb(II); $M^2$ represents at least one of Fe(II), Fe(III), Co(III), Cr(III), Mn(II), Mn(III), Ir(III), Rh(III), Ru(II), V(IV) or V(V); $M^3$ represents $M^1$ and/or $M^2$; A, B and C each represent anions which are the same or different; L represents an alcohol, aldehyde, ketone, ether, ester, amide, nitrile or sulphide or mixtures thereof; a and d are numbers to satisfy the valency state of $M^1$ and $M^2$ in the double metal cyanide part of the general formula I; b and c are integers (b>c) which together with a and d provide the electroneutrality of the double metal cyanide part of the general formula I; e is an integer satisfying the valency state of $N^3$; n and m are integers satisfying the electroneutrality of HC, and w is a number between 0.1 and 4;
x is a number up to 20;
y is a number between 0.1 and 6; and
z is a number between 0.1 and 5.

4. A foam according to claim 2 wherein the double metal cyanide complex has the general formula $$M^1{}_a[M^2(CN)_b(A)_c]_d \cdot wM^3B_e \cdot xH_2O \cdot yL \cdot zH_nC_m \quad (I)$$

wherein $M^1$ represents at least one of Zn(II), Fe(II), Co(II), Ni(II), Mn(II), Cu(II), Sn(II) or Pb(II); $M^2$ represents at least one of Fe(II), Fe(III), Co(III), Cr(III), Mn(II), Mn(III), Ir(III), Rh(III), Ru(II), V(IV) or V(V); $M^3$ represents $M^1$ and/or $M^2$; A, B and C each represent anions which are the same or different; L represents an alcohol, aldehyde, ketone, ether, ester, amide, nitrile or sulphide or mixtures thereof; a and d are numbers to satisfy the valency state of $M^1$ and $M^2$ in the double metal cyanide part of the general formula I; b and c are integers (b>c) which together with a and d provide the electroneutrality of the double metal cyanide part of the general formula I; e is an integer satisfying the valency state of $M^3$; n and m are integers satisfying the electroneutrality of HC, and w is a number between 0.1 and 4;
x is a number up to 20;
y is a number between 0.1 and 6; and
z is a number between 0.1 and 5.

5. A foam according to claim 1, characterized in that the double metal cyanide complex of general formula I is a zinc hexacyano cobaltate complex of general formula $$Zn_3[Co(CN)_6]_2 \cdot wM^3X_2 \cdot xH_2O \cdot yL \cdot zHX \quad (II)$$

wherein X represents a halide, $M^3$ represents Zn(II), Co(II) or Fe(II), L represents an alcohol, ether or ester, and w is a number between 0.7 and 1.5
x is a number between 2 and 10
y is a number between 1.5 and 3
z is a number between 0.15 and 1.5.

6. A foam according to claim 1, wherein the double metal cyanide complex is used in combination with a cocatalyst selected from group a.

7. A foam according to claim 1, wherein the cocatalyst is zinc sulphate.

8. A foam according to claim 1 wherein the epoxy compound is propylene oxide.

9. A foam according to claim 1 wherein the reaction is carried out at a temperature in the range of from 70° to 120° C.

10. A foam according to claim 1 wherein the reaction is carried out at a pressure in the range of from 2 to 15 bar absolute.

11. A foam according to claim 1, wherein the double metal cyanide complex and the cocatalyst are used in a molar ratio in the range of from 4 to 0.2.

12. A foam according to claim 5, wherein L represents an acyclic diether.

13. A foam based on a polycarbonate polyol made by reacting at least one epoxy commpound and carbon dioxide at a temperature in the range of from 40° to 200° C. and at a pressure in the range of from 2 to 40 bar absolute, characterized in that the reaction is carried out in the presence of an organic compound having at least one active hydrogen, a catalytic amount of a double metal cyanide complex, and a cocatalyst selected from the group consisting of
   (a) one or more salts composed of at least bivalent metal ions and metal-free anions, having a solubility in water of at least 1 g/100 ml at 25° C.,
   (b) one or more metal-free acids of which a 0.1N solution in water at 25° C. has a pH not exceeding 3, and
   (c) mixtures of (a) and (b).

14. A foam according to claim 13 wherein the organic compound having at least one active hydrogen is a trihydric alcohol.

15. A foam according to claim 14 wherein the trihydric alcohol is a propoxylated glycerol having a molecular weight in the range of 200 to 2,000.

16. A foam according to claim 13, wherein the double metal cyanide complex and the cocatalyst are used in a molar ratio in the range of from 10 to 0.1.

17. A foam according to claim 13 wherein the double metal cyanide complex has the general formula $$M^1{}_a[M^2(CN)_b(A)_c]_d \cdot wM^3B_e \cdot xH_2O \cdot yL \cdot zH_nC_m \qquad (I)$$

wherein $M^1$ represents at least one of Zn(II), Fe(II), Co(II), Ni(II), Mn(II), Cu(II), Sn(II) or Pb(II); $M^2$ represents at least one of Fe(II), Fe(III), Co(III), Cr(III), Mn(II), Mn(III), Ir(III), Rh(III), Ru(II), V(IV) or V(V); $M^3$ represents $M^1$ and/or $M^2$; A, B and C each represent anions which are the same or different; L represents an alcohol, aldehyde, ketone, ether, ester, amide, nitrile or sulphide or mixtures thereof; a and d are numbers to satisfy the valency state of $M^1$ and $M^2$ in the double metal cyanide part of the general formula I; b and c are integers (b>c) which together with a and d provide the electroneutrality of the double metal cyanide part of the general formula I; e is an integer satisfying the valency state of $M^3$; n and m are integers satisfying the electroneutrality of HC, and w is a number between 0.1 and 4;
x is a number up to 20;
y is a number between 0.1 and 6; and
z is a number between 0.1 and 5.

18. A foam according to claim 14 wherein the double metal cyanide complex has the general formula $$M^1{}_a[M^2(CN)_b(A)_c]_d \cdot wM^3B_e \cdot xH_2O \cdot yL \cdot zH_nC_m \qquad (I)$$

wherein $M^1$ represents at least one of Zn(II), Fe(II), Co(II), Ni(II), Mn(II), Cu(II), Sn(II) or Pb(II); $M^2$ represents at least one of Fe(II), Fe(III), Co(III), Cr(III), Mn(II), Mn(III), Ir(III), Rh(III), Ru(II), V(IV) or V(V); $M^3$ represents $M^1$ and/or $M^2$; A, B and C each represent anions which are the same or different; L represents an alcohol, aldehyde, ketone, ester, amide, nitrile or sulphide or mixtures thereof; a and d are numbers to satisfy the valency state of $M^1$ and $M^2$ in the double metal cyanide part of the general formula I; b and c are integers (b>c) which together with a and d provide the electroneutrality of the double metal cyanide part of the general formula I; e is an integer satisfying the valency state of $M^3$; n and m are integers satisfying the electroneutrality of HC, and w is a number between 0.1 and 4;
x is a number up to 20;
y is a number between 0.1 and 6; and
z is a number between 0.1 and 5.

19. A foam according to claim 13, characterized in that the double metal cyanide complex of general formula I is a zinc hexacyano cobaltate complex of general formula $$Zn_3[Co(CN)_6]_2 \cdot wM^3X_2 \cdot xH_2O \cdot yL \cdot zHX \qquad (II)$$

wherein X represents a halide, $M^3$ represents Zn(II), Co(II) or Fe(II), L represents an alcohol, ether or ester, and w is a number between 0.7 and 1.5
x is a number between 2 and 10
y is a number between 1.5 and 3
z is a number between 0.15 and 1.5.

20. A foam according to claim 13, wherein the double metal cyanide complex is used in combination with a cocatalyst selected from group a.

21. A foam according to claim 13, wherein the cocatalyst is zinc sulphate.

22. A foam according to claim 13, wherein the epoxy compound is propylene oxide.

23. A foam according to claim 13, wherein the reaction is carried out at a temperature in the range of from 70° to 120° C.

24. A foam according to claim 13, wherein the reaction is carried out at a pressure in the range of from 2 to 15 bar absolute.

25. A foam according to claim 13 wherein the catalyst is used in an amount which corresponds to 0.01 to 15%w of the amount of organic compound having at least one active hydrogen.

26. A foam according to claim 13 wherein the catalyst is used in an amount which corresponds to 0.5 to 5%w of the amount of organic compound having at least one active hydrogen.

27. A foam according to claim 13, wherein the double metal cyanide complex and the cocatalyst are used in a molar ratio in the range of from 4 to 0.2.

28. A foam according to claim 17, wherein L represents an acyclic diether.

* * * * *